(12) United States Patent
Matsushita et al.

(10) Patent No.: US 6,670,040 B1
(45) Date of Patent: Dec. 30, 2003

(54) CARBON FIBER-REINFORCED CARBON COMPOSITE BODY AND METHOD OF MANUFACTURING THE SAME

(75) Inventors: Junichi Matsushita, Hadano (JP); Samon Tanaka, Kokubunji (JP)

(73) Assignee: Tokai University Educational System (JP)

( * ) Notice: Subject to any disclaimer, the term of this patent is extended or adjusted under 35 U.S.C. 154(b) by 0 days.

(21) Appl. No.: 09/613,097

(22) Filed: Jul. 10, 2000

(30) Foreign Application Priority Data

Jul. 14, 1999 (JP) .......................... 11-200487
Jul. 14, 1999 (JP) .......................... 11-200488
Apr. 14, 2000 (JP) ....................... 2000-113571

(51) Int. Cl.$^7$ ............................... B32B 9/00
(52) U.S. Cl. ................... 428/408; 428/145; 428/688; 428/698; 428/704
(58) Field of Search .................. 428/408, 367, 428/446, 450, 688, 689, 698, 704, 902, 378, 472, 145, 113; 427/228, 419.7, 249.15, 113, 387, 397.7

(56) References Cited

U.S. PATENT DOCUMENTS

| 4,892,790 A | * | 1/1990 | Gray ........................ 428/548 |
| 5,441,762 A | * | 8/1995 | Gray et al. ............... 427/190 |
| 5,562,966 A | * | 10/1996 | Clarke et al. ............. 428/13 |
| 5,962,103 A | * | 10/1999 | Luthra et al. ............. 428/107 |

FOREIGN PATENT DOCUMENTS

| EP | 0 176 055 | * | 4/1986 |
| JP | 4-316611 | | 11/1992 |
| JP | 5-186267 | | 7/1993 |
| JP | 8-253371 | | 10/1996 |

\* cited by examiner

*Primary Examiner*—Deborah Jones
*Assistant Examiner*—Abraham Bahta
(74) *Attorney, Agent, or Firm*—Pennie & Edmonds LLP (57) ABSTRACT

Disclosed is a carbon fiber-reinforced carbon composite body, characterized in that the inner region of the carbon fiber-reinforced carbon composite material is doped with silicon boride.

4 Claims, 3 Drawing Sheets

CARBON FIBER-REINFORCED CARBON COMPOSITE BODY AND METHOD OF MANUFACTURING THE SAME

CROSS-REFERENCE TO RELATED APPLICATIONS

This application is based upon and claims the benefit of priority from the prior Japanese Patent Applications No. 11-200487, filed Jul. 14, 1999; No. 11-200488, filed Jul. 14, 1999; and No. 2000-113571, filed Apr. 14, 2000, the entire contents of which are incorporated herein by reference.

BACKGROUND OF THE INVENTION

The present invention relates to a carbon fiber-reinforced carbon composite body excellent in oxidation resistance and suitable for use in the manufacture of, particularly, a sliding member in Concorde, a nose cone and a leading edge of a space shuttle, parts of a combustion engine, and medical parts such as an artificial root of tooth, bone and joint, and a method of manufacturing the same.

As widely known, the carbon fiber-reinforced carbon composite body exhibits an excellent mechanical strength under high temperatures and, thus, is expected to provide a material exhibiting a high mechanical strength under high temperatures. However, since the complex body consists of carbon alone, the composite body is oxidized under an oxidizing atmosphere of 500° C. or higher, resulting in failure to exhibit its excellent characteristics under very high temperatures.

It was customary in the past to cover the carbon fiber-reinforced carbon composite body with a ceramic material in order to improve the oxidation resistance and resistance to chemicals. The particular technique is disclosed in, for example, Japanese Patent Disclosure (Kokai) No. 8-253371. One of the most popular methods of covering the composite body with the ceramic material is to employ a chemical vapor deposition (CVD) method. The CVD method certainly permits forming a thick ceramic material film. However, it is difficult to apply the CVD method to the carbon fiber-reinforced composite body having an irregular shape.

In recent years, the demands for a carbon fiber-reinforced carbon composite body exhibiting a sufficiently high oxidation resistance are being increased with progress of an international space program.

Also, conventional composite materials with improved oxidation resistance are disclosed in, for example, Japanese Patent Disclosure No. 4-316611 and Japanese Patent Disclosure No. 5-186267.

BRIEF SUMMARY OF THE INVENTION

A first object of the present invention is to provide a carbon fiber-reinforced carbon composite body doped with silicon boride, capable of preventing oxidation under high temperatures not lower than 500° C., exhibiting an excellent durability, and applicable to the manufacture of an article having an irregular shape, the carbon fiber-reinforced carbon composite body being hereinafter called a first invention.

A second object of the present invention is to provide a method of manufacturing a carbon fiber-reinforced carbon composite body capable of preventing oxidation under high temperatures not lower than 500° C., exhibiting an excellent durability, and applicable to the manufacture of an article having an irregular shape, comprising the steps of covering the surface of a carbon fiber-reinforced carbon composite material with a layer of silicon boride such as $SiB_4$ or $SiB_6$, and applying a hot pressing to the covering layer to permit the inner region of the composite body to be doped with the silicon boride, the method being hereinafter called a second invention.

A third object of the present invention is to provide a carbon fiber-reinforced carbon composite body covered with a surface layer impregnated with silicon boride and exhibiting the effects similar to those exhibited by the first invention, the carbon fiber-reinforced carbon composite body being hereinafter referred to as a third invention.

A fourth object of the present invention is to provide a method of manufacturing a carbon fiber-reinforced carbon composite body exhibiting effects similar to those exhibited by the second invention, comprising the steps of dipping a carbon fiber-reinforced carbon composite body in a suspension prepared by dispersing a powdery silicon boride of $SiB_4$ or $SiB_6$ in an organic dispersing medium to permit the composite body to be impregnated with the silicon boride, and evaporating the organic dispersing medium to form a surface layer impregnated with the silicon boride on the surface of the composite body, the method being hereinafter referred to as a fourth invention.

A fifth object of the present invention is to provide a carbon fiber-reinforced carbon composite body covered with a calcium boride layer forming an oxidation resistant film of $CaB_4O_7$ or $CaB_2O_4$ during oxidation under high temperatures, and exhibiting an excellent oxidation resistance and an excellent durability, the carbon fiber-reinforced carbon composite body being hereinafter referred to as a fifth invention.

A sixth object of the present invention is to provide a method of manufacturing a carbon fiber-reinforced carbon composite body exhibiting the effects similar to the effects exhibited by the fifth invention, comprising the steps of dipping a carbon fiber-reinforced carbon composite material in a dispersion prepared by dispersing a powdery $CaB_6$ in an organic solvent to permit the carbon composite material to be impregnated with the dispersion, and applying a degreasing treatment to the composite body to form a calcium boride layer on the surface of the composite body, the method being hereinafter referred to as a sixth invention.

A seventh object of the present invention is to provide a method of manufacturing a carbon fiber-reinforced carbon composite body excellent in oxidation resistance and durability and applicable to the manufacture of an article having a complex shape, comprising the steps of setting a carbon fiber-reinforced carbon composite material in a container housing a dispersion prepared by dispersing a calcium boride powder in an organic solvent, and forming a calcium boride layer on at least the surface of the composite material by a cold isostatic press method, the method being hereinafter referred to as a seventh invention.

An eighth object of the present invention is to provide a carbon fiber-reinforced carbon composite body exhibiting the effects similar to those exhibited by the fifth invention, comprising a carbon fiber-reinforced carbon composite material and a calcium boride composite material layer containing a chromium compound and formed on the surface of the carbon composite body, the carbon fiber-reinforced carbon composite body being hereinafter referred to as an eighth invention.

A ninth object of the present invention is to provide a method of manufacturing a carbon fiber-reinforced carbon composite body exhibiting the effects similar to those exhibited by the fifth invention, comprising the steps of dipping a carbon fiber-reinforced carbon composite material containing calcium boride and a chromium compound in a dispersion prepared by dispersing a $CaB_6$ composite material in an organic solvent, and applying a degreasing treatment to form a calcium boride complex layer on the surface of the composite material, the method being hereinafter referred to as a ninth invention.

Further, a tenth object of the present invention is to provide a method of manufacturing a carbon fiber-reinforced carbon composite body exhibiting the effects similar to those exhibited by the seventh invention, comprising the steps of setting a carbon fiber-reinforced carbon composite material in a container housing a dispersion prepared by dispersing a calcium boride complex powder having a chromium compound added thereto, and forming a calcium boride complex layer on at least the surface of the composite material by a cold isostatic press method, the method being hereinafter referred to as a tenth invention.

According to the first invention, there is provided a carbon fiber-reinforced carbon composite body, characterized in that the inner region of the carbon fiber-reinforced carbon composite material is doped with silicon boride.

According to the second invention, there is provided a method of manufacturing a carbon fiber-reinforced carbon composite body, characterized by comprising the steps of forming a covering layer consisting of silicon boride such as $SiB_4$ or $SiB_6$ on the surface of the carbon fiber-reinforced carbon composite material, and doping the inner region of the carbon fiber-reinforced carbon composite body with the silicon boride by applying a hot pressing.

According to the third invention, there is provided a carbon fiber-reinforced carbon composite body, characterized in that a covering layer impregnated with silicon boride is formed on the surface of the carbon fiber-reinforced carbon composite material.

According to the fourth invention, there is provided a method of manufacturing a carbon fiber-reinforced carbon composite body, characterized by comprising the steps of dipping a carbon fiber-reinforced carbon composite material in a dispersion prepared by dispersing a powdery silicon boride of $SiB_4$ or $SiB_6$ in an organic solvent to permit the carbon composite material to be impregnated with silicon boride, and evaporating the organic solvent so as to form a covering layer impregnated with silicon boride on the surface of the carbon composite material.

According to the fifth invention, there is provided a carbon fiber-reinforced carbon composite body, characterized in that a calcium boride layer forming an oxidation resistant film consisting of at least one of $CaB_4O_7$ and $CaB_2O_4$ during oxidation under high temperatures is formed on at least the surface of the carbon fiber-reinforced carbon composite material.

According to the sixth invention, there is provided a method of manufacturing a carbon fiber-reinforced carbon composite body, characterized by comprising the steps of dipping a carbon fiber-reinforced carbon composite material in a dispersion prepared by dispersing a calcium boride powder in an organic solvent for impregnating the carbon composite material with calcium boride, and applying a degreasing treatment to form a calcium boride layer on the surface of the carbon composite material.

According to the seventh invention, there is provided a method of manufacturing a carbon fiber-reinforced carbon composite body, characterized by comprising the steps of setting a carbon fiber-reinforced carbon composite material in a container housing a dispersion prepared by dispersing a calcium boride powder in an organic solvent, and forming a calcium boride layer on at least the surface of the carbon composite material by a cold isostatic press method.

According to the eighth invention, there is provided a carbon fiber-reinforced carbon composite body, characterized in that a calcium boride complex layer having a chromium compound added thereto is formed on the surface of the carbon fiber-reinforced carbon composite material.

According to the ninth invention, there is provided a method of manufacturing a carbon fiber-reinforced carbon composite body, characterized by comprising the steps of dipping a carbon fiber-reinforced carbon composite material in a dispersion prepared by dispersing a calcium boride composite material having a chromium compound added thereto in an organic solvent, and applying a degreasing treatment to form a calcium boride complex layer having a chromium compound added thereto on the surface of the carbon composite material.

Further, according to the tenth invention, there is provided a method of manufacturing a carbon fiber-reinforced carbon composite body, characterized by comprising the steps of setting a carbon fiber-reinforced carbon composite material in a container housing a dispersion prepared by dispersing a calcium boride composite material having a chromium compound added thereto in an organic solvent, and forming a calcium boride complex layer having a chromium compound added thereto on at least the surface of the carbon composite body by a cold isostatic press method.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL
VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

The present invention will now be described in detail.

In the present invention, a carbon fiber-reinforced carbon composite body, hereinafter referred to simply as a "composite body", is manufactured as follows. In the first step, prepared is a prepreg by impregnating or coating a carbon fiber such as a bidirectional fabric including a plain weave fabric, a satin weave fabric, and a twill fabric; a unidirectional oriented material; a three-way oriented material; n-way oriented material; felt; and rattan with a binder consisting of a thermosetting resin such as a phenolic resin, a urea resin, a melamine resin, or a furan resin, or a thermoplastic resin such as carbon black, tar or pitch. Then, the prepreg is molded under heat and pressure to obtain a molding, followed by applying a heat treatment to the molding to completely harden the binder. Then, the molding is calcined by the ordinary method and, as required, graphitized to obtain a composite material used in the present invention.

In the present invention (first invention), a carbon fiber-reinforced carbon composite body (hereinafter referred to as a "composite body") is manufactured through steps 1) to 3) given below:

1) The carbon fiber-reinforced carbon composite material is dipped in a dispersion prepared by dispersing a silicon boride powder such as $SiB_4$ or $SiB_6$ in an organic solvent such as a liquid polyethylene glycol to permit the composite material to be impregnated with a silicon boride so as to cover the surface of the composite material with the silicon boride powder of $SiB_4$ or $SiB_6$.
2) The composite material is subjected to adegreasing treatment at 300° C. so as to completely evaporate polyethylene glycol contained in the surface layer of the composite material.
3) Further, a hot pressing is applied to permit the inner region of the carbon composite material to be impregnated with silicon boride.

In the first invention, the silicon boride of $SiB_4$ or $SiB_6$ doped inside the carbon composite material forms a borosilicate glass consisting of $B_2O_3$ and $SiO_2$ under an oxygen atmosphere so as to form an oxidation resistant barrier. As a result, the oxidation resistance of the composite material is markedly improved so as to provide a composite body excellent in oxidation resistance.

In the second invention, a covering layer consisting of silicon boride of $SiB_4$ or $SiB_6$ is formed on the surface of the carbon composite material. The technical scope of the second invention covers the case where not only the surface region but also the inner region of the carbon composite material is impregnated with the silicon boride.

In the third invention, a covering layer consisting of silicon boride is formed on the surface of the carbon composite material. The technical scope of the second invention covers the case where not only the surface region but also the inner region of the carbon composite material is impregnated with the silicon boride. The composite body of the third invention is manufactured by the steps 1) and 2) given below:

1) The step of dipping a carbon composite material in a dispersion prepared by dispersing a powder of silicon boride of $SiB_4$ or $SiB_6$ in an organic dispersing medium so as to permit the composite material to be impregnated with the silicon boride.
2) The step of evaporating the organic dispersing medium so as to form a covering layer impregnated with silicon boride on the surface of the composite material.

The composite body of the fifth invention is featured in that a calcium boride layer is formed on at least the surface of the composite material. Calcium boride is capable of forming an oxidation resistant film consisting of $CaB_4O_7$, $CaB_2O_4$ or both $CaB_4O_7$ and $CaB_2O_4$ during oxidation under high temperatures. The fifth invention covers the cases where the oxidation resistant film is formed on only the surface of the composite material, where the surface of the composite material is impregnated with the oxidation resistant material, and where the oxidation resistant layer is formed on the surface of the composite material and the inner region of the composite material is impregnated with the oxidation resistant material. It follows that the term "forming" implies at least one of the covering of the surface of the composite material and the impregnation in the inner region of the composite material.

In the fifth invention, the term "high temperature" in the oxidizing step under high temperatures represents the temperature range of about 500° C. to 1500° C. In the case of $CaB_2O_4$, the high temperature represents the temperature up to 800° C. under an atmospheric pressure, and where the pressure exceeds an atmospheric pressure, the high temperature represents the temperature range of 800° C. to 1000° C. Also, in the case of $Cr_2O_3$, the high temperature represents the temperature range of 1000° C. to 1200° C. It follows that fifth invention covers three cases where the oxidation resistant film is formed of $CaB_2O_4$ alone, where the oxidation resistant film is formed of $Cr_2O_3$ alone, and the case where the oxidation resistant film is formed of both $CaB_2O_4$ and $Cr_2O_3$.

In the present invention, the organic solvent used consists of, for example, polyethylene glycol. Also, the temperature for the degreasing treatment, which differs depending on the kind of the organic solvent used, is 300 to 800° C., preferably 400 to 600° C. in the case of using polyethylene glycol as the organic solvent. If the degreasing temperature is lower than 300° C., a carbide tends to remain in the composite material. On the other hand, if the degreasing temperature exceeds 800° C., the organic component tends to rapidly evaporate to form voids within the composite material.

According to the present invention, the composite body consists of carbon alone. Therefore, a composite body excellent in oxidation resistance and capable of preventing oxidation, which is a serious problem under an environment of very high temperatures, can be obtained by forming silicon boride or calcium boride in a composite material that is oxidized under an oxidizing atmosphere of 500° C. or higher. Also, since the composite material is isotropically impregnated with calcium boride, a calcium boride layer can be formed uniformly even if the composite material is shaped complex by using a CIP (cold isostatic press) for impregnating the composite material with calcium boride or the like. Needless to say, the material of the oxidation resistant film is not limited to calcium boride. It is also possible to use other materials, e.g., silicon boride, for forming the oxidation resistant film.

Examples of the present invention will now be described. In the following Examples, the materials, the numeral values, etc. represent no more than examples of the present invention, and do not limit the technical scope of the present invention.

EXAMPLE 1

Figure 1:
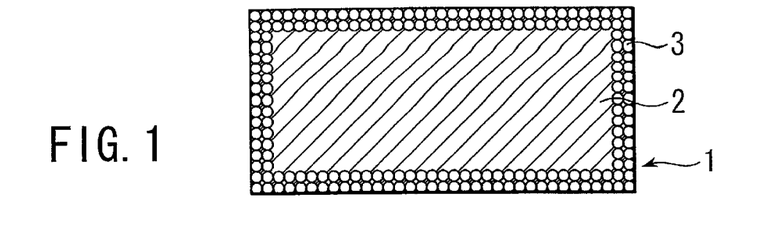
FIG. 1 is a cross sectional view showing a carbon fiber-reinforced carbon composite body according to Example 1 of the present invention.

FIG. 1 shows a carbon fiber-reinforced carbon composite body 1 according to Example 1 of the present invention. As shown in the drawing, the composite body 1 consists of a carbon fiber-reinforced carbon composite material (composite material) 2 and silicon boride 3 doped inside the composite material 2.

Composite body 1 of Example 1 is manufactured as follows.

In the first step, prepared is the composite material 2. The composite material 2 is prepared by forming a prepreg by impregnating or coating a carbon fiber such as a bidirectional plain weave fabric with a binder such as a phenolic resin, carbon black, tar, or pitch, followed by compression molding under heat to form a molding. The molding thus prepared is subjected to a heat treatment so as to harden completely the binder, followed by calcining the molding by an ordinary method to obtain the desired composite material 2.

In the next step, a powder of $SiB_4$ or silicon boride $SiB_6$ having a particle diameter of about 1.0 to 10.0 $\mu$m was dispersed in an organic solvent of polyethylene glycol having a coefficient of viscosity of 6 to 9 Pa·s so as to obtain a dispersion. Then, the composite material 2 calcined at the pore treating temperature of 1000 to 2000° C. was dipped in the dispersion to permit the composite material 2 to be impregnated with polyethylene glycol containing the silicon boride, followed by applying a vacuum impregnation treatment to the composite material 2 impregnated with polyethylene glycol containing silicon boride within a vacuum desiccator. As a result, the surface of the composite material 2 was covered with a powder of $SiB_4$ or $SiB_6$.

Further, a degreasing treatment was applied to the composite material 2 at 300° C. so as to evaporate completely the polyethylene glycol attached to the surface of the composite material. Still further, a hot press was applied to the composite material 2 under a pressure of 40 MPa and at a temperature of 1500° C. so as to permit the inner region of the composite material to be impregnated with silicon boride 3, thereby obtaining a carbon fiber-reinforced carbon composite body 1 containing silicon boride 3 inside the composite body 1.

Figure 2:
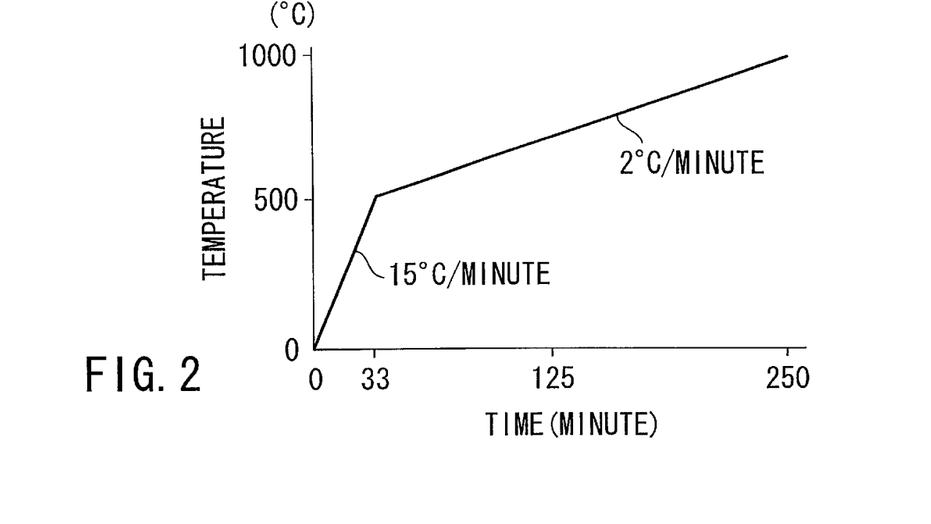
FIG. 2 is a graph showing the change with time in the temperature of the composite body in the test for evaluating the capability of the oxidation resistance of the composite body of the present invention.

(Evaluation of Oxidation Resistance Capability):

For evaluating the oxidation resistance of the composite material, an oxidation test under an elevated temperature using a differential thermal analyzer and a constant temperature oxidation test using an electric furnace were conducted. The oxidation resistance capability was evaluated from the relationship among the heating temperature, the heating time, and the change in mass. The temperature elevation rate in the oxidation test under an elevated temperature was set at 15° C./min until the temperature was elevated to reach 500° C. and at 2° C./min after the temperature exceeded 500° C., as shown in FIG. 2. On the other hand, the oxidation test under a constant temperature was carried out at 700 to 1500° C.

(Result of Evaluation of the Oxidation Resistance Capability):

In the oxidation resistance test under an elevated temperature from room temperature to 1000° C. using TG (thermogravimetry), the temperature at the time when the loss of mass was 20% was about 700° C. in the case of the untreated carbon fiber-reinforced carbon composite body. On the other hand, the temperature noted above was elevated to 800° C. in the case of the composite body having a doping treatment applied thereto. Also, in the oxidation resistance test under a constant temperature, the required time up to 20% of loss of mass in the case of the composite body having a doping treatment applied thereto was found to be at least three times as long as in the case of the untreated composite body. The difference in the required time noted above was increased with increase in the temperature. The experimental data clearly support that the doping treatment was effective for improving the oxidation resistance of the composite body.

As described above, the composite body 1 in Example 1 consists of the composite material 2 and silicon boride 3 doped inside the composite material 2. Therefore, the composite body 1 is enabled to withstand oxidation under a high temperature environment of 500° C. or higher so as to exhibit an excellent oxidation resistance and a high durability. Also, since an excellent oxidation resistance can be imparted to a composite material of a complex shape without relying on the conventional technique of utilizing a gaseous phase chemical vapor deposition method, the method of the present invention can be applied to a raw material having a complex shape. Further, since the inner region of the composite material is doped with silicon boride to form an oxidation resistant layer integral with the composite material, it is possible to obtain a tough article free from cracking, peeling off, or the like of the covering layer.

EXAMPLE 2

Figure 3:
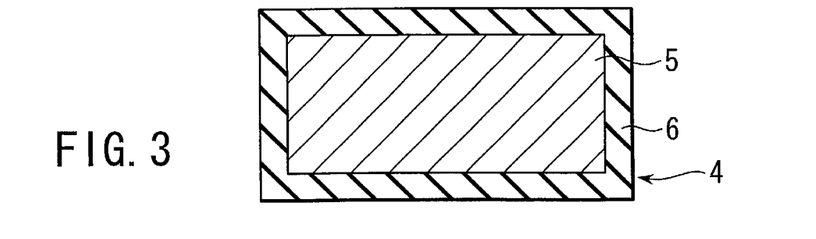
FIG. 3 is a cross sectional view showing the carbon fiber-reinforced carbon composite body according to Example 2 of the present invention.

FIG. 3 shows a carbon fiber-reinforced carbon composite body 4 according to Example 2 of the present invention. As shown in the drawing, the composite body 4 consists of a carbon fiber-reinforced carbon composite material 5 and a covering layer 6 made of silicon boride and impregnated in the surface region of the composite material 5.

Composite body 4 of Example 2 is manufactured as follows.

In the first step, prepared is the composite material 5. The composite material 5 is prepared as in Example 1. In the next step, a powder of $SiH_4$ or silicon boride $SiB_6$ having a particle diameter of about 1.0 $\mu$m was dispersed in an organic solvent of polyethylene glycol having a coefficient of viscosity of 6 to 9 Pa·s so as to obtain a dispersion. Then, the composite material 5 calcined at the pore treating temperature of 1000 to 2000° C. was dipped in the dispersion to permit the composite material 5 to be impregnated with polyethylene glycol containing the silicon boride, followed by applying a vacuum impregnation treatment to the composite material 5 impregnated with polyethylene glycol containing silicon boride within a vacuum desiccator. As a result, the surface of the composite material 5 was covered with a powder of $SiH_4$ or silicon bromide $SiB_6$.

Further, a degreasing treatment was applied to the composite material 5 at 300° C. so as to evaporate completely the polyethylene glycol attached to the surface of the composite material and, thus, to obtain a carbon fiber-reinforced carbon composite body 4 having the surface covered uniformly with a covering layer 6 made of silicon boride.

(Evaluation of Oxidation Resistance Capability):

For evaluating the oxidation resistance of the composite material, an oxidation test under an elevated temperature using a differential thermal analyzer and a constant temperature oxidation test using an electric furnace were conducted. The oxidation resistance capability was evaluated from the relationship among the heating temperature, the heating time, and the change in mass. The temperature elevation rate in the oxidation test under an elevated temperature was set at 15° C./min until the temperature was elevated to reach 500° C. and at 2° C./min after the temperature exceeded 500° C., as shown in FIG. 2. On the other hand, the oxidation test under a constant temperature was carried out at 700 to 1500° C.

(Result of Evaluation of the Oxidation Resistance Capability):

In the oxidation resistance test under an elevated temperature from room temperature to 1000° C. using TG (thermogravimetry), the temperature at the time when the loss of mass was 20% was about 700° C. in the case of the untreated carbon fiber-reinforced carbon composite body. On the other hand, the temperature noted above was elevated to 800° C. in the case of the composite body having a doping treatment applied thereto. Also, in the oxidation resistance test under a constant temperature, the required time up to 20% of loss of mass in the case of the composite body having a doping treatment applied thereto was found to be at least three times as long as that in the case of the untreated composite body. The difference in the required time noted above was increased with increase in the temperature. The experimental data clearly support that the doping treatment was effective for improving the oxidation resistance of the composite body.

As described above, the composite body 4 in Example 2 consists of the composite material 5 and the covering layer 6 made of silicon boride and impregnated in the surface region of the composite material 5. Therefore, the composite body 4 is enabled to withstand oxidation under a high temperature environment of 500° C. or higher so as to exhibit an excellent oxidation resistance and a high durability. Also, since an excellent oxidation resistance can be imparted to a composite material of a complex shape without relying on the conventional technique of utilizing a gaseous phase chemical vapor deposition method, the method of the present invention can be applied to a raw material having a complex shape.

EXAMPLE 3

Figure 4:
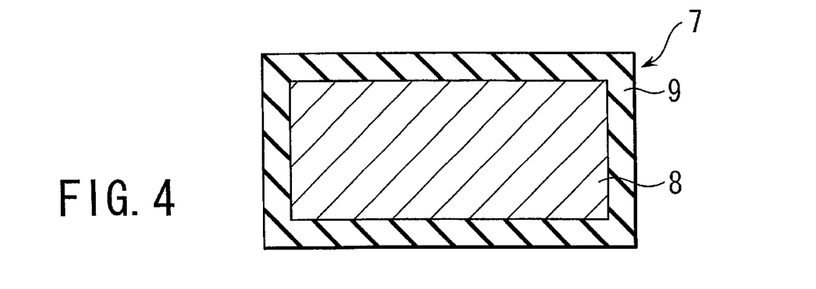
FIG. 4 is a cross sectional view showing the carbon fiber-reinforced carbon composite body according to Example 3 of the present invention.

FIG. 4 shows a carbon fiber-reinforced carbon composite body 7 according to Example 3 of the present invention. As shown in the drawing, the composite body 7 consists of a carbon fiber-reinforced carbon composite material 8 and a covering layer 9 made of calcium boride and formed on the surface of the composite material 7. It should be noted that the covering layer 9 made of calcium boride is capable of forming an oxidation resistant film consisting of $CaB_4O_7$, $CaB_2O_4$ or both $CaB_4O_7$ and $CaB_2O_4$ during oxidation under high temperatures.

As described above, the composite body 7 according to Example 3 of the present invention comprises the composite material 8 and the covering film 9 formed on the surface of the composite material 8 and capable of forming an oxidation resistant film consisting of $CaB_4O_7$, $CaB_2O_4$ or both $CaB_4O_7$ and $CaB_2O_4$ during oxidation under high temperatures. Therefore, it is possible to obtain the composite body 7 excellent in oxidation resistance, which is capable of preventing oxidation that is a serious problem under an environment of very high temperatures.

Composite body 7 of Example 3 is manufactured as follows.

In the first step, prepared is the composite material 8. The composite material 8 is prepared as in Example 1. In the next step, a powder of calcium boride having a particle diameter of about 1.0 to 10.0 $\mu$m was dispersed in an organic solvent of polyethylene glycol having a coefficient of viscosity of 6 to 9 Pa·s so as to obtain a dispersion. Then, the composite material 8 calcined at the pore treating temperature of 1000 to 2000° C. was dipped in the dispersion to permit the composite material 8 to be impregnated with polyethylene glycol containing the calcium boride, followed by applying a vacuum impregnation treatment to the composite material 8 impregnated with polyethylene glycol containing calcium boride within a vacuum desiccator. Further, a degreasing treatment was applied to the composite material 8 at 300° C. so as to evaporate completely the polyethylene glycol attached to the surface of the composite material and, thus, to obtain a carbon fiber-reinforced carbon composite body 7 having the surface covered uniformly with a powder of calcium boride.

(Evaluation of Oxidation Resistance Capability):

For evaluating the oxidation resistance of the composite material, an oxidation test under an elevated temperature using a differential thermal analyzer and a constant temperature oxidation test using an electric furnace were conducted. The oxidation resistance capability was evaluated from the relationship among the heating temperature, the heating time, and the change in mass. The temperature elevation rate in the oxidation test under an elevated temperature was set as shown in FIG. 2, as in Example 1. On the other hand, the oxidation test under a constant temperature was carried out at 700 to 1500° C.

The composite body 7 of Example 3 consists of the composite material 8 and a covering layer 9 formed on the surface of the composite material 8 and made of calcium boride capable of forming an oxidation resistant film made of $CaB_4O_7$ or $CaB_2O_4$ during oxidation under high temperatures. The composite body 7 of the particular construction can be obtained by dipping the composite material 8, which is oxidized under an oxidizing atmosphere of at least 500° C., in a dispersion prepared by dispersing a calcium boride powder in an organic solvent so as to permit the composite material 8 to be impregnated with the dispersion and, then, completely evaporating the organic solvent so as to allow the composite material 8 to be covered with a calcium boride powder. It should be noted that the calcium boride powder covering the surface of the composite material 8 is oxidized to form an oxidation resistant barrier consisting of $CaB_4O_7$ or $CaB_2O_4$ so as to markedly improve the oxidation resistance of the composite body 7.

Figure 5:
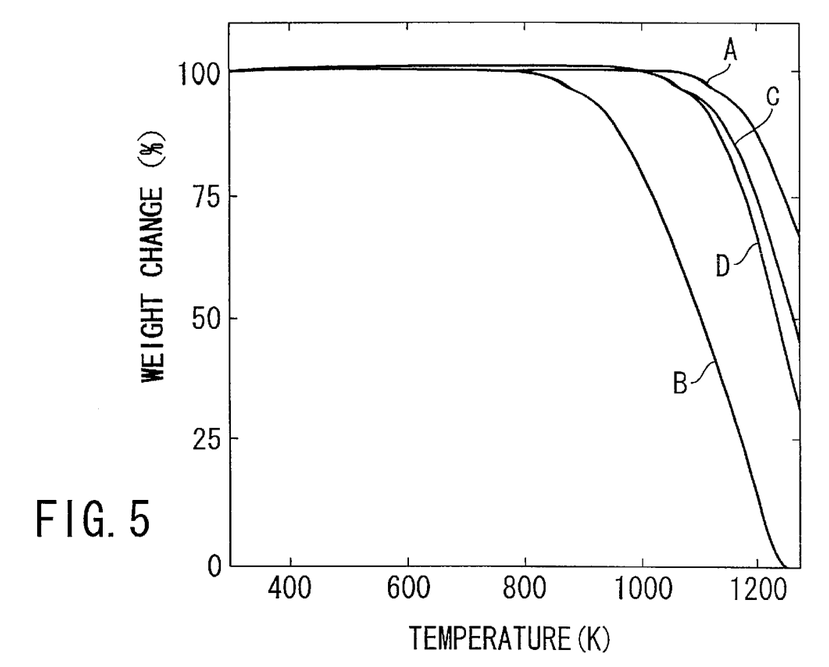
FIG. 5 is a graph showing the change with temperature in weight of the carbon fiber-reinforced carbon composite body of the present invention and the conventional composite body.

As a matter of fact, the change with temperature elevation in weight was examined with respect to the carbon fiber-reinforced carbon composite body (C/C composite body) of Example 3 and the conventional C/C composite body that did not contain calcium boride, with the results as shown in FIG. 5. Curve A in FIG. 5 represents the C/C composite body of the present invention, with curve B representing the conventional C/C composite body. FIG. 5 clearly shows that the C/C composite body having a calcium boride layer formed on the surface of the composite material as in the present invention permits decreasing the weight reduction with increase in temperature, compared with the conventional C/C composite body. In other words, the C/C composite body of the present invention permits improving the oxidation resistance, compared with the conventional C/C composite body. Incidentally, the change in weight with temperature elevation was also measured with respect to the C/C composite body containing silicon boride ($SiB_6$) and the C/C composite body containing silicon boride ($SiB_4$), with the results as denoted by curves C and D, respectively, in FIG. 5.

Figure 6:
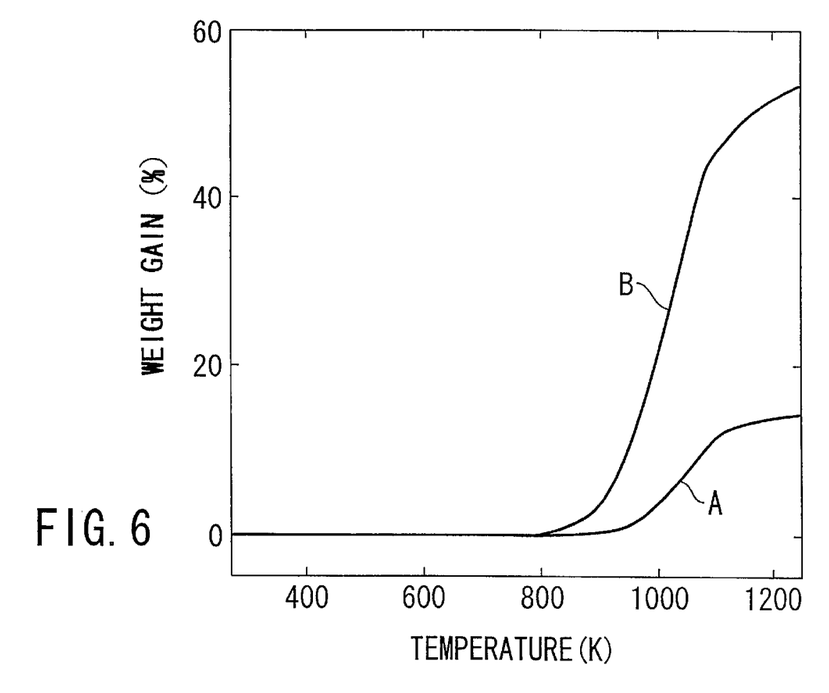
FIG. 6 is a graph showing the change with temperature in weight of the carbon fiber-reinforced carbon composite body of the present invention, covering the cases where a silicon boride powder and a calcium boride powder were added, respectively.

Further, the change in weight with the oxidizing temperature elevation within the air was also measured with respect to the C/C composite body containing a calcium boride ($CaB_6$) powder and the C/C composite body containing a silicon boride ($SiB_6$) powder, with the results as shown in FIG. 6. It is clearly shown in FIG. 6 that the weight reduction in the case of using a calcium boride powder (curve A) was smaller than that in the case of using a silicon boride powder, supporting that the C/C composite body containing a calcium boride powder is excellent in its oxidation resistance.

EXAMPLE 4

Figure 7:
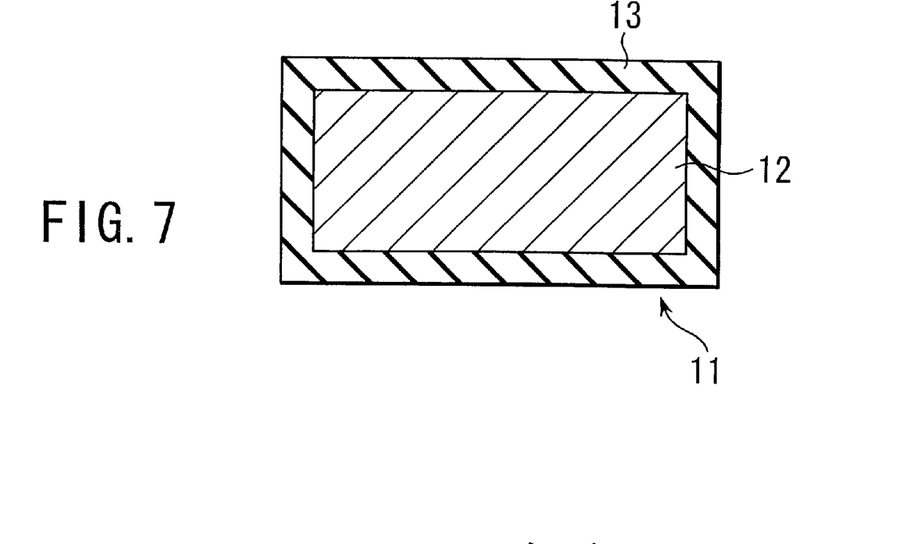
FIG. 7 is a cross sectional view showing the carbon fiber-reinforced carbon composite body according to Example 4 of the present invention.

FIG. 7 shows a carbon fiber-reinforced carbon composite body 11 according to Example 4 of the present invention. As shown in the drawing, the composite body 11 consists of a carbon fiber-reinforced carbon composite material 12 and a composite covering layer 13 made of a composite material consisting of calcium boride and a chromium compound, and formed on the surface of the composite material 12. It should be noted that the composite covering layer 13 consists of a composite material consisting of calcium boride and a chromium compound.

As described above, the composite body 11 according to Example 4 of the present invention comprises the composite material 12 and the composite covering film 13 formed on the surface of the composite material 12 and consisting of a composite material consisting of calcium boride and a chromium compound. Therefore, it is possible to obtain the composite body 11 excellent in oxidation resistance, which is capable of preventing oxidation that is a serious problem under an environment of very high temperatures.

Composite body 11 of Example 4 is manufactured as follows.

In the first step, prepared is the composite material 12. The composite material 12 is prepared as in Example 1. In the next step, a powder of calcium boride composite material containing a chromium compound, said powder having a particle diameter of about 1.0 to 10.0 $\mu$m, was dispersed in an organic solvent of polyethylene glycol having a coefficient of viscosity of 6 to 9 Pa·s so as to obtain a dispersion. Then, the composite material 12 calcined at the pore treating temperature of 1000 to 2000° C. was dipped in the dispersion to permit the composite material 12 to be impregnated with the dispersion, followed by applying a vacuum impregnation treatment to the composite material 12 impregnated with the dispersion within a vacuum desiccator. Further, a degreasing treatment was applied to the composite material 12 at 300° C. so as to evaporate completely the polyethylene glycol attached to the surface of the composite material and, thus, to obtain a carbon fiber-reinforced carbon composite body 11 having the surface covered uniformly with a powder of calcium boride.

For evaluating the oxidation resistance of the composite body 11 prepared as above and having an oxidation resistant covering layer 13, an oxidation test under an elevated temperature using a differential thermal analyzer and a constant temperature oxidation test using an electric furnace were conducted. The oxidation resistance capability was evaluated from the relationship among the heating temperature, the heating time, and the change in mass. The temperature elevation rate in the oxidation test under an elevated temperature was set as shown in FIG. 2, as in Example 1. On the other hand, the oxidation test under a constant temperature was carried out at 700 to 1500° C.

The composite body 11 of Example 4 consists of the composite material 12 and the composite covering layer 13 formed on the surface of the composite material 12 and made of a composite material consisting of calcium boride and a chromium compound. The composite body 11 of the particular construction can be obtained by dipping the composite material 12, which is oxidized under an oxidizing atmosphere of at least 500° C., in a dispersion prepared by dispersing a composite powder of calcium boride and a chromium compound in an organic solvent so as to permit the composite material 12 to be impregnated with the dispersion and, then, completely evaporating the organic solvent so as to allow the composite material 12 to be covered with a composite powder of calcium boride and a chromium compound. It should be noted that the composite powder of calcium boride and a chromium compound covering the surface of the composite material 12 is oxidized to form an oxidation resistant barrier consisting of $CaB_4O_7$, $CaB_2O_4$ and $Cr_2O_3$ so as to markedly improve the oxidation resistance of the composite body 11.

EXAMPLE 5

Figure 8:
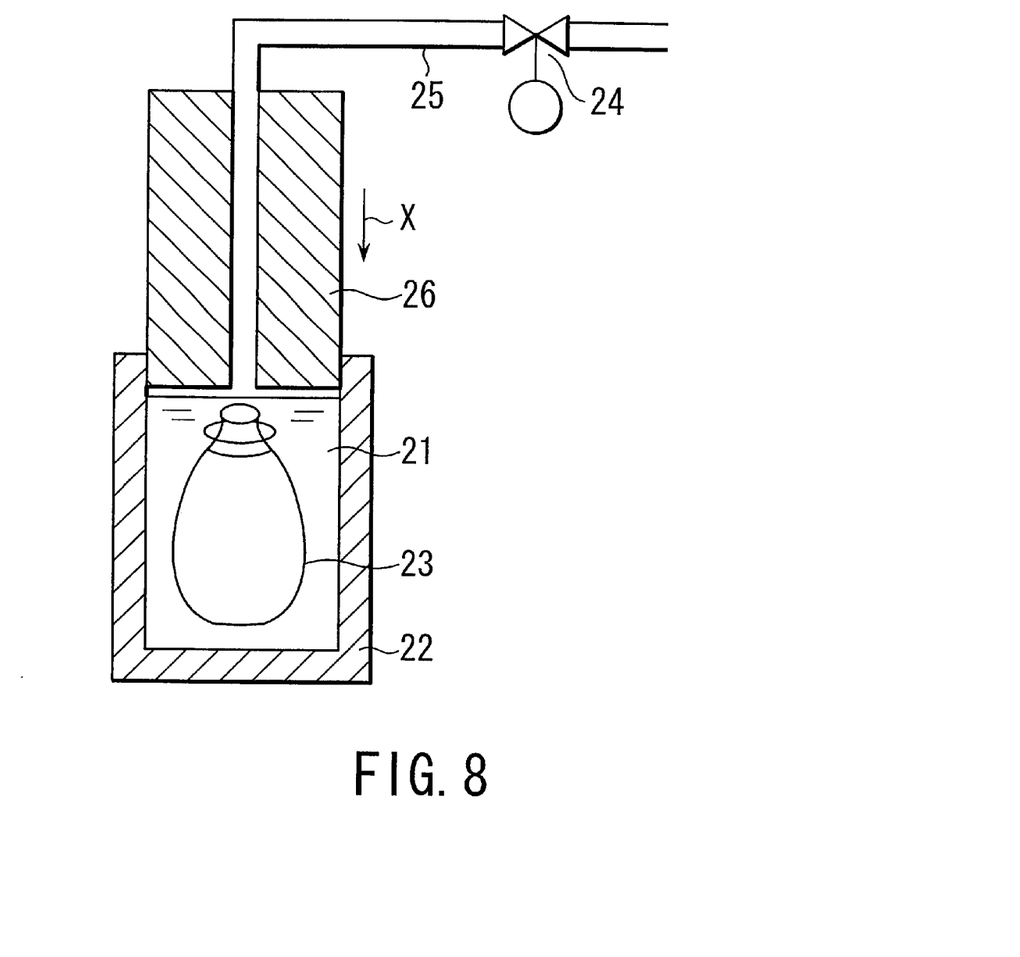
FIG. 8 shows how the carbon fiber-reinforced carbon composite body was manufactured in Example 4 of the present invention.

A calcium boride layer was formed on the surface of a carbon fiber-reinforced carbon composite material by a CIP (cold isostatic press) method by using an apparatus shown in FIG. 8.

In the first step, a calcium boride ($CaB_6$) powder having a particle diameter of about 10.0 $\mu$m and a concentration of 3% was put in an organic solvent of polyethylene glycol having a coefficient of viscosity of 6 to 9 Pa·s and housed in a container (not shown), and the resultant dispersion was sufficiently stirred to prepare a solution. Then, the solution and a carbon fiber-reinforced carbon composite material were put in a bag 23 made of a latex rubber and housed in a pressure vessel 22 filled with water 21, followed by applying a vacuum degassing and subsequently closing the mouth of the bag 23. Then, a cylinder 26 provided with a pipe 25 having a valve 24 mounted thereto was moved in a direction denoted by an arrow X with the valve 24 kept closed so as to isotropically apply pressure to the mixed solution put in the bag 23, there by obtaining a composite body. Pressure of, for example, 1 to 2 tons/cm$^2$ was kept applied to the mixed solution for 1 to 10 minutes, preferably 2 to 5 minutes.

According to Example 5, a calcium boride layer is formed by the CIP method on the surface of the carbon fiber-reinforced carbon composite material, making it possible to allow calcium boride to permeate uniformly in the surface region of the composite material even if the carbon composite material is shaped complex. As a result, a calcium boride layer is formed uniformly on the surface of the composite material.

In Example 5, calcium boride, ethylene glycol and a composite material were put in the latex bag for manufacturing a carbon fiber-reinforced carbon composite body. However, it is also possible to manufacture the composite body by directly putting ethylene glycol and the composite material in the pressure vessel.

EXAMPLE 6

A composite covering layer was formed on the surface of a carbon fiber-reinforced carbon complex material as in Example 5, except that a composite material for forming the surface layer consisting of calcium boride and a chromium compound was used in place of calcium boride alone used in Example 5. A covering layer of the composite material was formed uniformly on the surface of the carbon fiber-reinforced composite material as in Example 5, even where the carbon fiber-reinforced composite material was shaped complex.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A carbon fiber-reinforced carbon composite body, wherein the inner region of the carbon fiber-reinforced carbon composite material is doped with silicon boride.

2. A carbon fiber-reinforced carbon composite body, wherein a covering layer impregnated with $SiB_4$ or $SiB_6$, is formed on the surface of the carbon fiber-reinforced carbon composite material.

3. A carbon fiber-reinforced carbon composite body, wherein a calcium boride layer forming an oxidation resistant film consisting of at least one of $CaB_4O_7$ and $CaB_2O_4$ during oxidation is formed on at least the surface of the carbon fiber-reinforced carbon composite material.

4. A carbon fiber-reinforced carbon composite body, wherein a layer consisting of at least one of $CaB_4O_7$ or $CaB_2O_4$ having a $Cr_2O_3$ added thereto is formed on the surface of the carbon fiber-reinforced carbon composite material.

* * * * *